US010782462B2

(12) United States Patent
Ogomi et al.

(10) Patent No.: US 10,782,462 B2
(45) Date of Patent: Sep. 22, 2020

(54) POLARIZER, POLARIZING PLATE, AND IMAGE DISPLAY APPARATUS

(71) Applicant: NITTO DENKO CORPORATION, Ibaraki-shi, Osaka (JP)

(72) Inventors: Daisuke Ogomi, Ibaraki (JP); Yuji Saiki, Ibaraki (JP); Masahiro Yaegashi, Ibaraki (JP)

(73) Assignee: NITTO DENKO CORPORATION, Ibaraki-shi (JP)

(*) Notice: Subject to any disclaimer, the term of this patent is extended or adjusted under 35 U.S.C. 154(b) by 0 days.

(21) Appl. No.: 15/306,390

(22) PCT Filed: Apr. 23, 2015

(86) PCT No.: PCT/JP2015/062357
§ 371 (c)(1),
(2) Date: Oct. 24, 2016

(87) PCT Pub. No.: WO2015/163401
PCT Pub. Date: Oct. 29, 2015

(65) Prior Publication Data
US 2017/0045656 A1 Feb. 16, 2017

(30) Foreign Application Priority Data

Apr. 25, 2014 (JP) ................................ 2014-091842
Apr. 22, 2015 (JP) ................................ 2015-087685

(51) Int. Cl.
*G02B 5/30* (2006.01)
*G02B 5/20* (2006.01)

(52) U.S. Cl.
CPC .............. *G02B 5/305* (2013.01); *G02B 5/20* (2013.01); *G02B 5/3033* (2013.01)

(58) Field of Classification Search
CPC ............ G02B 1/08; G02B 5/3025–305; G02F 1/133528; H04N 1/00129; H04N 7/142–144; H04N 2007/145; G03B 17/48
(Continued)

(56) References Cited

U.S. PATENT DOCUMENTS 2,409,923 A 10/1946 Barnes
2,647,440 A 8/1953 Rehorn
(Continued)

FOREIGN PATENT DOCUMENTS

CN 101569205 A 10/2009
CN 101925846 A 12/2010
(Continued)

OTHER PUBLICATIONS

Office Action dated Dec. 6, 2017, issued in Korean Patent Application No. 10-2015-7036599 with translation (corresponds to U.S. Appl. No. 15/306,362).
(Continued)

*Primary Examiner* — Arnel C Lavarias
(74) *Attorney, Agent, or Firm* — Westerman, Hattori, Daniels & Adrian, LLP (57) ABSTRACT

A polarizer that can realize the multi-functionalization and high-functionalization of an electronic device, such as an image display apparatus. A polarizer 1 including a resin film containing a dichromatic substance, wherein the polarizer has a low dichromatic substance concentration portion whose content of the dichromatic substance is relatively low in the resin film. The low dichromatic substance concentration portion 2 is brought into contact with an acidic solution. The low dichromatic substance concentration portion corresponds to a camera portion of an image display apparatus on which the polarizer is mounted.

8 Claims, 4 Drawing Sheets

(58) Field of Classification Search
USPC .... 359/486.01–486.03, 487.01–487.06, 894; 348/14.08–14.1; 396/429; 428/1.31
See application file for complete search history.

(56) References Cited

U.S. PATENT DOCUMENTS

| | | |
|---|---|---|
| 4,181,756 A | 1/1980 | Fergason |
| 4,396,646 A | 8/1983 | Schuler et al. |
| 4,466,704 A | 8/1984 | Schuler et al. |
| 5,327,285 A | 7/1994 | Fairs |
| 5,374,477 A | 12/1994 | Lawless et al. |
| 5,430,566 A | 7/1995 | Sakaya et al. |
| 5,593,771 A | 1/1997 | Lawless et al. |
| 5,926,310 A | 7/1999 | Tamura et al. |
| 6,072,566 A | 6/2000 | Fujii |
| 6,188,451 B1 | 2/2001 | Fujii |
| 6,258,429 B1 | 7/2001 | Nelson |
| 6,590,605 B1 | 7/2003 | Eichenlaub |
| 6,606,136 B2 | 8/2003 | Matsumoto et al. |
| 6,757,102 B2 | 6/2004 | Nishida et al. |
| 8,101,884 B2 | 1/2012 | Kato et al. |
| 8,130,293 B2 | 3/2012 | Kanamori et al. |
| 8,248,558 B2 | 8/2012 | Kimura et al. |
| 8,259,263 B2 | 9/2012 | Kimura et al. |
| 8,277,587 B2 | 10/2012 | Kimura et al. |
| 8,314,987 B2 | 11/2012 | Goto et al. |
| 8,320,042 B2 | 11/2012 | Goto et al. |
| 8,379,169 B2 | 2/2013 | Kitagawa et al. |
| 8,404,334 B2 | 3/2013 | Kimura et al. |
| 8,411,360 B2 | 4/2013 | Kitagawa et al. |
| 8,467,177 B2 | 6/2013 | Mathew et al. |
| 8,491,737 B2 | 7/2013 | Kimura et al. |
| 8,520,169 B2 | 8/2013 | Kitagawa et al. |
| 8,520,171 B2 | 8/2013 | Kitagawa et al. |
| 8,657,976 B2 | 2/2014 | Kimura et al. |
| 8,709,567 B2 | 4/2014 | Kitagawa et al. |
| 8,721,816 B2 | 5/2014 | Kitagawa et al. |
| 8,771,454 B2 | 7/2014 | Goto et al. |
| 8,852,374 B2 | 10/2014 | Goto et al. |
| 9,023,168 B2 | 5/2015 | Kitagawa et al. |
| 9,039,861 B2 | 5/2015 | Yasui et al. |
| 9,143,668 B2 | 9/2015 | Mathew et al. |
| 9,169,423 B2 | 10/2015 | Yasui et al. |
| 9,244,307 B2 | 1/2016 | Hada et al. |
| 9,283,740 B2 | 3/2016 | Kitagawa et al. |
| 9,291,744 B2 | 3/2016 | Sawada et al. |
| 9,329,307 B2 | 5/2016 | Sawada et al. |
| 9,372,505 B2 | 6/2016 | Mathew et al. |
| 9,381,534 B2 | 7/2016 | Kim et al. |
| 9,442,234 B2 | 9/2016 | Kitagawa et al. |
| 9,442,235 B2 | 9/2016 | Kitagawa et al. |
| 9,459,390 B2 | 10/2016 | Kitagawa et al. |
| 9,488,756 B2 | 11/2016 | Yasui et al. |
| 9,557,450 B2 | 1/2017 | Yasui et al. |
| 9,618,668 B2 | 4/2017 | Kitagawa et al. |
| 9,744,750 B2 | 8/2017 | Kitagawa et al. |
| 9,925,553 B2 | 3/2018 | Kim et al. |
| 10,009,525 B2 | 6/2018 | Mathew et al. |
| 10,228,496 B2 | 3/2019 | Yasui et al. |
| 10,359,553 B2 | 7/2019 | Lee et al. |
| 10,421,264 B2 | 9/2019 | Kitagawa et al. |
| 10,429,560 B2 | 10/2019 | Lee et al. |
| 10,436,960 B2 | 10/2019 | Lee et al. |
| 10,436,962 B2 | 10/2019 | Lee et al. |
| 2002/0071179 A1 | 6/2002 | Maeda |
| 2004/0212555 A1 | 10/2004 | Falco |
| 2006/0222813 A1 | 10/2006 | Kato et al. |
| 2007/0224416 A1 | 9/2007 | Matsubayashi et al. |
| 2008/0192345 A1 | 8/2008 | Mochizuki et al. |
| 2009/0136712 A1 | 5/2009 | Sato |
| 2009/0278954 A1 | 11/2009 | Kanamori et al. |
| 2010/0032088 A1 | 2/2010 | Kato et al. |
| 2010/0283943 A1 | 11/2010 | Kimura et al. |
| 2010/0288420 A1 | 11/2010 | Kimura et al. |
| 2010/0316817 A1 | 12/2010 | Kimura et al. |
| 2012/0052197 A1 | 3/2012 | Sawada et al. |
| 2012/0055607 A1 | 3/2012 | Kitagawa et al. |
| 2012/0055608 A1 | 3/2012 | Kitagawa et al. |
| 2012/0055621 A1 | 3/2012 | Goto et al. |
| 2012/0055622 A1 | 3/2012 | Kitagawa et al. |
| 2012/0055623 A1 | 3/2012 | Kitagawa et al. |
| 2012/0056211 A1 | 3/2012 | Kitagawa et al. |
| 2012/0056340 A1 | 3/2012 | Kitagawa et al. |
| 2012/0057104 A1 | 3/2012 | Kitagawa et al. |
| 2012/0057107 A1 | 3/2012 | Kitagawa et al. |
| 2012/0057231 A1 | 3/2012 | Goto et al. |
| 2012/0057232 A1 | 3/2012 | Goto et al. |
| 2012/0058291 A1 | 3/2012 | Kitagawa et al. |
| 2012/0058321 A1 | 3/2012 | Goto et al. |
| 2012/0105400 A1 | 5/2012 | Mathew et al. |
| 2012/0106063 A1 | 5/2012 | Mathew et al. |
| 2012/0160420 A1 | 6/2012 | Kimura et al. |
| 2012/0180930 A1 | 7/2012 | Kimura et al. |
| 2012/0206641 A1 | 8/2012 | Baba |
| 2012/0211167 A1 | 8/2012 | Kimura et al. |
| 2012/0216937 A1 | 8/2012 | Kimura et al. |
| 2012/0300299 A1 | 11/2012 | Yasui et al. |
| 2013/0017363 A1 | 1/2013 | Morioka et al. |
| 2013/0100529 A1 | 4/2013 | Kitagawa et al. |
| 2013/0114139 A1 | 5/2013 | Kitagawa et al. |
| 2013/0141787 A1 | 6/2013 | Kim et al. |
| 2013/0160938 A1 | 6/2013 | Yasui et al. |
| 2013/0216805 A1 | 8/2013 | Yasui et al. |
| 2013/0265708 A1 | 10/2013 | Mathew et al. |
| 2014/0016198 A1 | 1/2014 | Sawada et al. |
| 2014/0044947 A1 | 2/2014 | Sawada et al. |
| 2014/0118826 A1 | 5/2014 | Jiao et al. |
| 2014/0130955 A1 | 5/2014 | Yasui et al. |
| 2014/0186568 A1 | 7/2014 | Kitagawa et al. |
| 2014/0342129 A1 | 11/2014 | Kim et al. |
| 2014/0378020 A1 | 12/2014 | Hada et al. |
| 2015/0158046 A1 | 6/2015 | Kim et al. |
| 2015/0160390 A1 | 6/2015 | Goyal et al. |
| 2015/0183199 A1 | 7/2015 | Kitagawa et al. |
| 2015/0219797 A1 | 8/2015 | Goto et al. |
| 2016/0025910 A1 | 1/2016 | Sawada et al. |
| 2016/0054494 A1 | 2/2016 | Kitagawa et al. |
| 2016/0103258 A1 | 4/2016 | Kitagawa et al. |
| 2016/0195644 A1 | 7/2016 | Yasui et al. |
| 2016/0195645 A1 | 7/2016 | Yasui et al. |
| 2016/0195653 A1 | 7/2016 | Lee |
| 2016/0195767 A1 | 7/2016 | Lee et al. |
| 2016/0202403 A1 | 7/2016 | Mathew et al. |
| 2016/0212311 A1 | 7/2016 | Mathew et al. |
| 2016/0299271 A1 | 10/2016 | Lee et al. |
| 2016/0299272 A1 | 10/2016 | Lee et al. |
| 2016/0313480 A1 | 10/2016 | Lee et al. |
| 2016/0377777 A1 | 12/2016 | Lee et al. |
| 2017/0045656 A1 | 2/2017 | Ogomi |
| 2017/0045657 A1 | 2/2017 | Ogomi et al. |
| 2017/0052299 A1 | 2/2017 | Ogomi et al. |
| 2017/0090086 A1 | 3/2017 | Goto et al. |
| 2017/0090087 A1 | 3/2017 | Goto et al. |
| 2017/0129197 A1 | 5/2017 | Yaegashi et al. |
| 2017/0131448 A1 | 5/2017 | Lee et al. |
| 2017/0131449 A1 | 5/2017 | Yaegashi et al. |
| 2017/0131451 A1 | 5/2017 | Yaegashi et al. |
| 2017/0254939 A1 | 9/2017 | Lee et al. |
| 2018/0188421 A1 | 7/2018 | Yasui et al. |

FOREIGN PATENT DOCUMENTS

| | | |
|---|---|---|
| CN | 102331635 A | 1/2012 |
| CN | 102609038 A | 7/2012 |
| CN | 202394154 U | 8/2012 |
| CN | 105229506 A | 1/2016 |
| CN | 105247395 A | 1/2016 |
| JP | S48-38160 A | 6/1973 |
| JP | S48-64941 A | 9/1973 |
| JP | 58-49901 A | 3/1983 |
| JP | 58-168019 A | 10/1983 |
| JP | S58-168018 A | 10/1983 |
| JP | S58-168020 A | 10/1983 |
| JP | S58168018 A | 10/1983 |

(56) References Cited

FOREIGN PATENT DOCUMENTS

| | | |
|---|---|---|
| JP | S59-58419 A | 4/1984 |
| JP | 59-172610 A | 9/1984 |
| JP | 60-133401 A | 7/1985 |
| JP | H07-000770 B2 | 1/1995 |
| JP | H08-506867 A | 7/1996 |
| JP | H09-241594 A | 9/1997 |
| JP | H10-90675 A | 4/1998 |
| JP | H10-183390 A | 7/1998 |
| JP | 11-052130 A | 2/1999 |
| JP | 2001-075048 A | 3/2001 |
| JP | 2003-207608 A | 7/2003 |
| JP | 2004-054031 A | 2/2004 |
| JP | 2005-089782 A | 4/2005 |
| JP | 2005-089783 A | 4/2005 |
| JP | 2005-336249 A | 12/2005 |
| JP | 2006-308938 A | 11/2006 |
| JP | 2006308923 A | 11/2006 |
| JP | 2007-070440 A | 3/2007 |
| JP | 2007-241314 A | 9/2007 |
| JP | 2008-102246 A | 5/2008 |
| JP | 2008-102274 A | 5/2008 |
| JP | 2009-130317 A | 6/2009 |
| JP | 2011-081315 A | 4/2011 |
| JP | 2012-073563 A | 4/2012 |
| JP | 2012-073574 A | 4/2012 |
| JP | 2012-98726 A | 5/2012 |
| JP | 2012-133308 A | 7/2012 |
| JP | 2012-137738 A | 7/2012 |
| JP | 2013-065995 A | 4/2013 |
| JP | 2013-137738 A1 | 7/2013 |
| JP | 2013-218319 A | 10/2013 |
| JP | 2014-81482 A | 5/2014 |
| JP | 2014081482 A | 5/2014 |
| JP | 2014-167548 A | 9/2014 |
| JP | 2014-211548 A | 11/2014 |
| JP | 2015-215609 A | 12/2015 |
| JP | 2016-525725 A | 8/2016 |
| JP | 2016-538599 A | 12/2016 |
| JP | 2017-500606 A | 1/2017 |
| JP | 2017503193 A | 1/2017 |
| KR | 20050070688 A | 7/2005 |
| KR | 20050085865 A | 8/2005 |
| KR | 10-2009-0107648 A | 10/2009 |
| KR | 10-2009-0129947 A | 12/2009 |
| KR | 20090132406 A | 12/2009 |
| KR | 10-2010-0087837 A | 8/2010 |
| KR | 10-2010-0125537 A | 12/2010 |
| KR | 10-2010-0125558 A | 12/2010 |
| KR | 10-2011-0105803 A | 9/2011 |
| KR | 10-2011-0110889 A | 10/2011 |
| KR | 10-2012-0046035 A | 5/2012 |
| KR | 10-2012-0118205 A | 10/2012 |
| KR | 10-2013-0012026 A | 1/2013 |
| KR | 10-2013-0019001 A | 2/2013 |
| KR | 10-2013-0056323 A | 5/2013 |
| KR | 101293210 B1 | 8/2013 |
| KR | 10-2013-0098914 A | 9/2013 |
| KR | 10-2014-0009035 A | 1/2014 |
| KR | 10-2015-0058450 A | 5/2015 |
| KR | 10-2015-0086159 A | 7/2015 |
| KR | 10-2015-0111871 A | 10/2015 |
| KR | 10-2015-0111878 A | 10/2015 |
| KR | 10-2015-0111879 A | 10/2015 |
| KR | 10-2016-0089349 A | 7/2016 |
| KR | 10-1706863 B1 | 2/2017 |
| TW | 200420705 A | 10/2004 |
| TW | 200949321 A | 12/2009 |
| TW | 201028436 A | 8/2010 |
| TW | I333502 B | 11/2010 |
| TW | 201219914 A | 5/2012 |
| TW | 201224716 A1 | 6/2012 |
| TW | 201307512 A | 2/2013 |
| TW | 201329535 A | 7/2013 |
| TW | 201530199 A | 8/2015 |
| TW | 201602653 A | 1/2016 |
| WO | 2006/095815 A1 | 9/2006 |
| WO | 2008/155873 A1 | 12/2008 |
| WO | 2009/128122 A1 | 10/2009 |
| WO | 2014/065140 A1 | 5/2014 |
| WO | 2015/046969 A1 | 4/2015 |
| WO | 2015/108261 A | 7/2015 |
| WO | 2015/147552 A1 | 10/2015 |
| WO | 2015147551 A1 | 10/2015 |
| WO | 2016003105 A1 | 1/2016 |

OTHER PUBLICATIONS

International Search Report dated Aug. 11, 2015, issued in PCT/JP2015/068504.
International Search Report dated Aug. 11, 2015, issued in PCT/JP2015/068501.
International Search Report dated Aug. 11, 2015, issued in PCT/JP2015/068503.
International Search Report dated Aug. 11, 2015, issued in PCT/JP2015/068502.
Office Action dated Mar. 9, 2017, issued in Japanese Patent Application No. JP2015-127644.
Office Action dated Mar. 9, 2017, issued in Japanese Patent Application No. JP2015-127641.
Office Action dated Mar. 9, 2017, issued in Japanese Patent Application No. JP2015-127642.
Korean Prior Art Search issued in KR20157036634.
Non-Final Office Action dated Nov. 15, 2017, issued in U.S. Appl. No. 15/321,974.
Office Action dated Jan. 17, 2017, issued in Korean Patent Application No. 20157036688.
Office Action dated May 25, 2016, issued in Korean Patent Application No. 20157036668.
Non-Final Office Action dated Jun. 1, 2017, issued in U.S. Appl. No. 15/322,258.
Final Office Action dated Nov. 2, 2017, issued in U.S. Appl. No. 15/322,258.
Non-Final Office Action dated Oct. 20, 2017, issued in U.S. Appl. No. 15/306,362.
Office Action dated Jan. 16, 2017 issued in Korean Patent Application No. 10-2015-7036599 with English translation (corresponding to U.S. Appl. No. 15/306,362).
Office Action dated Jan. 16, 2017 issued in Korean Patent Application No. 10-2015-7036600 with English translation (corresponding us U.S. Appl. No. 15/306,316).
International Search Report dated Jul. 7, 2015, issued in International Application No. PCT/JP20151062357, with English translation. (5 pages).
Office Action dated May 18, 2016, issued in counterpart Korean Patent Application No. 10-2015-7036565, with English translation. (12 pages).
Korean Prior Art Search (for preferential examination), issued in counterpart Korean Patent Application No. 10-2015-7036565, with English translation. (15 pages).
Office Action dated Mar. 8, 2017, issued in Japanese Patent Application No. 2015-087685, with English translation.
Office Action dated Mar. 8, 2017, issued in Japanese Patent Application No. 2015-087686, with English translation (Corresponds to U.S. Appl. No. 15/306,362).
Office Action dated Mar. 8, 2017, issued in Japanese Patent Application No. 2015-087687, with English translation (Corresponds to U.S. Appl. No. 15/306,316).
International Search Report dated Jul. 7, 2015, issued in PCT/JP2015/062359, with English translation (Corresponds to U.S. Appl. No. 15/306,316).
International Search Report dated Jun. 9, 2015, issued i n PCT/JP2015/062358 (2 pages) (Corresponds to U.S. Appl. No. 15/306,362).
Non Final Office Action dated Sep. 13, 2017, issued in U.S. Appl. No. 15/271,891.
Non Final Office Action dated Apr. 16, 2018, issued in U.S. Appl. No. 15/271,891.
Non Final Office Action dated Apr. 20, 2018, issued in U.S. Appl. No. 15/271,949.

(56) References Cited

OTHER PUBLICATIONS

Non Final Office Action dated Sep. 7, 2017, issued in U.S. Appl. No. 15/271,973.
Non Final Office Action dated Mar. 30, 2018, issued in U.S. Appl. No. 15/271,973.
Office Action dated Jan. 24, 2018, issued in Japanese application No. JP2015-190040, with translation.
Office Action dated Jan. 24, 2018, issued in Japanese application No. JP2015-190081, with translation.
Office Action dated Jan. 24, 2018, issued in Japanese application No. JP2015-190128, with translation.
Explanation of Circumstances Concerning Accelerated Examination filed on Nov. 21, 2017 issued in Japanese patent application No. 2015-190040 with translation.
Explanation of Circumstances Concerning Accelerated Examination filed on Nov. 21, 2017 issued in Japanese patent application No. 2015-190081 with translation.
Explanation of Circumstances Concerning Accelerated Examination filed on Nov. 21, 2017 issued in Japanese patent application No. 2015-190128 with translation.
Non Final Office Action dated Jul. 30, 2018, issued in U.S. Appl. No. 15/271,973.
Japanese Office Action dated May 30, 2018, issued in Japanese Patent Application No. 2015-190040 with English translation (Corresponds to U.S. Appl. No. 15/271,891).
Japanese Office Action dated May 30, 2018, issued in Japanese Patent Application No. 2015-190081 with English translation (Corresponds to U.S. Appl. No. 15/271,949).
Non Final Office Action dated May 17, 2018, issued in U.S. Appl. No. 15/321,875.
Non Final Office Action dated May 31, 2018, issued in U.S. Appl. No. 15/306,316.
Office Action dated Jul. 2, 2018, issued in Chinese application No. 201580035132.0, with English translation (corresponds to U.S. Appl. No. 15/321,875).
Office Action dated Jul. 2, 2018, issued in counterpart Chinese application No. 201580022128.0, with English translation.
Third Party Observation discovered Nov. 30, 2018, submitted to the Korean Patent Office on Aug. 23, 2018 for counterpart Korean application No. 10-2018-7003521, with English translation. (19 pages).
Office Action dated Dec. 18, 2018, issued in Taiwanese application No. 104120918 (counterpart to U.S. Appl. No. 15/321,875).
Office Action dated Aug. 20, 2018, issued in Taiwanese application No. 104113355 (Counterpart of U.S. Appl. No. 15/306,316), with English translation. (23 pages).
Third Party Observation dated Sep. 3, 2018, issued in Japanese application No. 2015-190081(Counterpart of U.S. Appl. No. 15/271,949), with English translation. (24 pages).
Third Observation dated Aug. 28, 2018, issued in Japanese application No. 2015-190040, (Counterpart of U.S. Appl. No. 15/271,891), with English translation. (25 pages).
Office Action dated Aug. 23, 2018, issued in Taiwanese application No. 104120925 (counterpart to U.S. Appl. No. 15/322,310), with English translation. (49 pages).
Non-Final Office Action dated Nov. 1, 2018, issued in U.S. Appl. No. 15/306,362 (20 pages).
Third Party Observation dated Jul. 31, 2018, filed in Japanese application No. 2015-127643 (counterpart to U.S. Appl. No. 15/321,875), with English translation. (33 pages).
Office Action dated Aug. 3, 2018, issued in Chinese application No. 201580022170.2 (Counterpart of U.S. Appl. No. 15/306,316), with English translation. (22 pages).
Office Action dated Oct. 19, 2018, issued in Taiwanese application No. 104113350 (counterpart to U.S. Appl. No. 15/306,362), with English translation. (9 pages).
Office Action dated Sep. 28, 2018, issued in Taiwanese application No. 104120928 (counterpart to U.S. Appl. No. 15/322,258), with English translation. (9 pages).
Office Action dated May 10, 2019, issued in counterpart TW application No. 104113359, with English translation. (11 pages).
Office Action dated Apr. 8, 2019, issued in KR application No. 10-2016-0124048 (counterpart to U.S. Appl. No. 15/271,973), with English translation. (11 pages).
Non-Final Office Action dated Oct. 3, 2019, issued in U.S. Appl. No. 15/306,362. (24 pages).
International Search Report dated Sep. 20, 2016, issued in counterpart International Application No. PCT/JP2016/068134, (counterpart to U.S. Appl. No. 15/739,531). (2 pages).
Third Party Observation dated Jul. 23, 2018, issued in JP Application No. 2015-127717 (counterpart to U.S. Appl. No. 15/739,531), with English translation. (12 pages).
Third Party Observation dated Jul. 18, 2018, issued in KR Application No. 10-2017-7036920 (counterpart to U.S. Appl. No. 15/739,531), with English translation. (22 pages).
Office Action dated Oct. 22, 2018, issued in KR Application No. 10-2017-7036920 (counterpart to U.S. Appl. No. 15/739,531), with English translation. (12 pages).
Office Action dated Aug. 2, 2019, issued in CN Application No. 201680037305.7 (counterpart to U.S. Appl. No. 15/739,531), with English translation. (17 pages).
Office Action dated Oct. 29, 2019, issued in TW Application No. 105119990 (counterpart to U.S. Appl. No. 15/739,531), with English translation. (17 pages).
Non-Final Office Action dated Sep. 20, 2019, issued in U.S. Appl. No. 15/739,531. (22 pages).
Third-Party Submission under 37 CFR 1.290, dated Sep. 16, 2019. (2 pages).
Office Action dated Mar. 20, 2020, issued in TW application No. 105128571 (counterpart to U.S. Appl. No. 15/271,973), with English translation. (14 pages).
Non-Final Office Action dated May 12, 2020, issued in U.S. Appl. No. 15/739,531. (10 pages).
Non-Final Office Action dated May 28, 2020, issued in U.S. Appl. No. 15/271,973. (20 pages).
Office Action dated Jun. 23, 2020, issued in counterpart KR application No. 10-2017-7011899, with English translation. (8 pages).
Office Action dated Jul. 6, 2020, issued in CN application No. 201580022170.2, with English translation. (21 pages) (Counterpart to U.S. Appl. No. 15/306,316).

POLARIZER, POLARIZING PLATE, AND IMAGE DISPLAY APPARATUS

TECHNICAL FIELD

The present invention relates to a polarizer, a polarizing plate, and an image display apparatus.

BACKGROUND ART

Some of the image display apparatus of a cellular phone, a notebook personal computer (PC), and the like have mounted thereon internal electronic parts, such as a camera. Various investigations have been made for the purpose of improving, for example, the camera performance of any such image display apparatus (for example, Patent Literatures 1 to 5). However, an additional improvement in camera performance or the like has been desired in association with rapid widespread use of a smart phone and a touch panel-type information processing apparatus. In addition, a polarizing plate partially having polarization performance has been required in order to correspond to the diversification of the shapes of the image display apparatus and the high-functionalization thereof.

CITATION LIST

Patent Literature

[PTL 1] JP 2011-81315 A
[PTL 2] JP 2007-241314 A
[PTL 3] US 2004/0212555 A1
[PTL 4] JP 2012-137738 A
[PTL 5] KR 10-2012-0118205 A

SUMMARY OF INVENTION

Technical Problem

The present invention has been made to solve the above-mentioned problems of the related art, and a primary object of the present invention is to provide a polarizer that can realize the multi-functionalization and high-functionalization of an electronic device, such as an image display apparatus.

Solution to Problem

A polarizer according to an embodiment of the present invention includes a resin film containing a dichromatic substance, wherein the polarizer has a low dichromatic substance concentration portion whose content of the dichromatic substance is relatively low in the resin film. The low dichromatic substance concentration portion is brought into contact with an acidic solution.

In one embodiment of the present invention, the resin film contains boric acid.

In one embodiment of the present invention, the acidic solution contains an acidic compound having an acid dissociation constant of less than 9.2.

In one embodiment of the present invention, the acidic solution contains an acidic compound having an acidity stronger than that of boric acid.

In one embodiment of the present invention, the resin film comprises a polyvinyl alcohol-based resin film containing iodine.

In one embodiment of the present invention, the low dichromatic substance concentration portion has a dichromatic substance content of 1.0 wt % or less.

In one embodiment of the present invention, the low dichromatic substance concentration portion has a transmittance of 50% or more.

In one embodiment of the present invention, the polarizer has a thickness of 30 μm or less.

In one embodiment of the present invention, the low dichromatic substance concentration portion corresponds to a camera portion of an image display apparatus on which the polarizer is mounted.

According to another aspect of the present invention, there is provided a polarizing plate. The polarizing plate includes the above described polarizer.

According to still another aspect of the present invention, there is provided an image display apparatus. The image display apparatus includes the above described polarizing plate.

Advantageous Effects of Invention

According to the present invention, there can be provided the polarizer that can achieve the multi-functionalization and high-functionalization of an electronic device. The polarizer of the present invention has a low dichromatic substance concentration portion having a content of the dichromatic substance relatively lower than that of another portion of the resin film. When the content of the dichromatic substance is relatively lower than that of another portion, the transmittance of the low concentration portion can increase. Further, the polarizer of the present invention is excellent in dimensional stability (e.g., dimensional stability under a humidified environment) of the low concentration portion. The polarizer of the present invention can be suitably used in an electronic device. For example, when the low concentration portion corresponds to the camera portion of an image display apparatus, the polarizer can secure a transmission property, and moreover, the polarizer can optimize brightness and a tint at the time of photographing, and prevent the distortion of an image to contribute to an improvement in camera performance. Further, the polarizer of the present invention can be suitably used not only in a reception-type electronic device, such as video apparatus or monitor, but also in a transmission-type electronic device, such as an LED light source or an infrared sensor, and an image display apparatus that secures a transmission property to a naked eye and the straightness of light.

DESCRIPTION OF EMBODIMENTS

Embodiments of the present invention are described below. However, the present invention is not limited to these embodiments.

A. Polarizer

Figure 1:
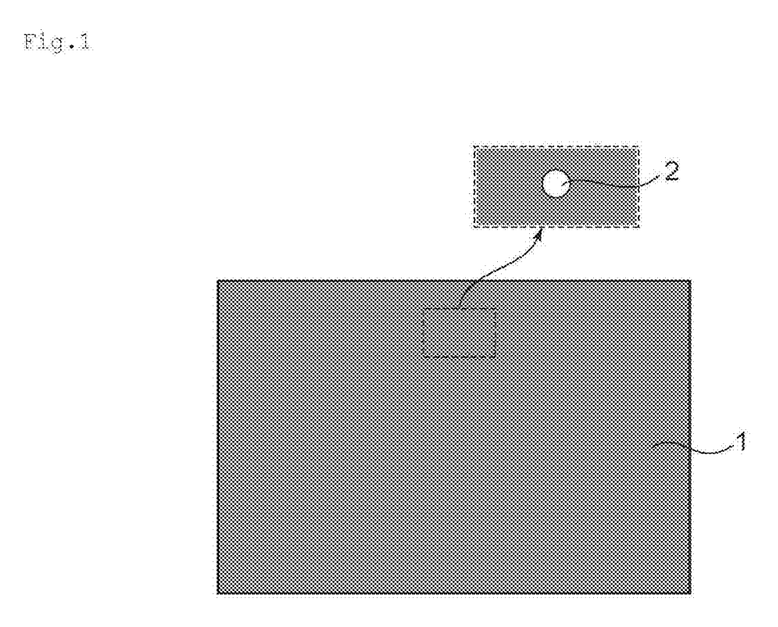
FIG. 1 is a plan view of a polarizer according to one embodiment of the present invention.

FIG. 1 is a plan view of a polarizer according to one embodiment of the present invention. A polarizer 1 includes a resin film containing a dichromatic substance, and has, in the resin film, a low dichromatic substance concentration portion 2 having a content of the dichromatic substance relatively lower than that of another portion of the resin film. The low concentration portion can function as a non-polarizing portion. According to such construction, a problem in terms of quality, such as cracking, delamination (interlayer peeling), or adhesive protrusion, can be avoided as compared to the case where a hole is formed in the resin film mechanically (specifically by a method involving mechanically punching out the hole through the use of, for example, chisel punching, a plotter, or a water jet). Further, when the content itself of the dichromatic substance in the resin film is reduced, a reduction in transmittance of the polarizer in association with its use can also be prevented.

The content of the dichromatic substance in the low concentration portion is preferably 1.0 wt % or less, more preferably 0.5 wt % or less, still more preferably 0.2 wt % or less. In addition, the content is preferably equal to or less than a detection limit. When the content falls within such range, desired transparency can be imparted to the low concentration portion, and moreover, in the case where the portion is used as a portion corresponding to the camera of an image display apparatus, photographing performance extremely excellent from both the viewpoints of brightness and a tint can be achieved. When iodine is used as the dichromatic substance, an iodine content can be determined from a calibration curve produced in advance from an X-ray intensity measured by fluorescent X-ray analysis through the use of a standard sample.

A difference between the content of the dichromatic substance in another portion of the polarizer (portion except the low concentration portion) and the content of the dichromatic substance in the low concentration portion is preferably 0.5 wt % or more, more preferably 1 wt % or more. When the difference between the contents falls within such range, the low concentration portion has sufficient transparency, and hence the low concentration portion can be suitably used as, for example, a portion corresponding to the camera of an image display apparatus.

The transmittance of the low concentration portion (e.g., a transmittance measured with light having a wavelength of 550 nm at 23° C.) is preferably 50% or more, more preferably 60% or more, still more preferably 75% or more, particularly preferably 90% or more. With such transmittance, the low concentration portion has desired transparency. As a result, when the portion is used as a portion corresponding to the camera of an image display apparatus, an adverse effect on the photographing performance of the camera can be prevented.

The polarizer (except the low concentration portion) preferably shows absorption dichroism in the wavelength range of from 380 nm to 780 nm. The single axis transmittance (Ts) of the polarizer (except the low concentration portion) is preferably 39% or more, more preferably 39.5% or more, still more preferably 40% or more, particularly preferably 40.5% or more. A theoretical upper limit for the single axis transmittance is 50%, and a practical upper limit therefor is 46%. In addition, the single axis transmittance (Ts) is a Y value measured with the two-degree field of view (C light source) of JIS Z 8701 and subjected to visibility correction, and can be measured with, for example, a microspectroscopic system (manufactured by Lambda Vision Inc., LVmicro). The polarization degree of the polarizer (except the low concentration portion) is preferably 99.8% or more, more preferably 99.9% or more, still more preferably 99.95% or more.

The thickness of the polarizer (resin film containing the dichromatic substance) may be set to any appropriate value. The thickness is typically 0.5 µm or more and 80 µm or less. The thickness is preferably 30 µm or less, more preferably 25 µm or less, still more preferably 18 µm or less, particularly preferably 12 µm or less, more particularly preferably less than 8 µm. The thickness is preferably 1 µm or more. As the thickness becomes smaller, the low concentration portion can be more satisfactorily formed. For example, when a basic solution is brought into contact with the resin film, the low concentration portion can be formed in a shorter time period. In addition, the thickness of the portion with which the basic solution is brought into contact may be smaller than that of another portion. When the thickness of the resin film is small, a difference in thickness between the portion brought into contact with the basic solution and another portion can be reduced, and hence the bonding of the polarizer to any other constituent member, such as a protective film, can be satisfactorily performed.

In the illustrated example, the low concentration portion 2 of a small circular shape is formed at a central portion in the upper end portion of the resin film, but the arrangement, shape, size, and the like of the low concentration portion may be appropriately designed. The design is performed in accordance with, for example, the position, shape, and size of the camera portion of an image display apparatus on which the polarizer is mounted. Specifically, the design is performed so that the low concentration portion may not correspond to the display screen of the image display apparatus on which the polarizer is mounted.

The resin film contains a dichromatic substance. Examples of the dichromatic substance include iodine and an organic dye. The substances may be used alone or in combination. Of those, iodine is preferably used. This is because of the following reason: when a basic solution is brought into contact with the resin film as described later, an iodine complex in the resin film is reduced and removed from the resin film, and as a result, a low concentration portion having such characteristics as to be proper for use as a camera hole or the like can be formed.

Any appropriate resin may be used as a resin for forming the resin film. A polyvinyl alcohol-based resin (hereinafter referred to as "PVA-based resin") is preferably used as the resin. Examples of the PVA-based resin include polyvinyl alcohol and an ethylene-vinyl alcohol copolymer. The polyvinyl alcohol is obtained by saponifying polyvinyl acetate. The ethylene-vinyl alcohol copolymer is obtained by saponifying an ethylene-vinyl acetate copolymer. The saponification degree of the PVA-based resin is typically 85 mol % or more and less than 100 mol %, preferably from 95.0 mol % to 99.95 mol %, more preferably from 99.0 mol % to 99.93 mol %. The saponification degree may be determined in conformity with JIS K 6726-1994. The use of the PVA-based resin having such saponification degree can provide a polarizer excellent in durability. When the saponification degree is too high, there is a risk of gelation.

The average polymerization degree of the PVA-based resin may be appropriately selected depending on purposes. The average polymerization degree is typically from 1,000 to 10,000, preferably from 1,200 to 4,500, more preferably from 1, 500 to 4,300. The average polymerization degree may be determined in conformity with JIS K 6726-1994.

At the time of the formation of the low concentration portion to be described later, the resin film is subjected to various treatments, such as a swelling treatment, a stretching treatment, a dyeing treatment with the dichromatic substance, a cross-linking treatment, a washing treatment, and a drying treatment, to be brought into a state in which the resin film can be used as a polarizer. When the resin film is subjected to the various treatments, the resin film may be a resin layer formed on a substrate. A laminate of the substrate and the resin layer can be obtained by, for example, a method involving applying an application liquid containing a material for forming the resin film to the substrate, or a method involving laminating the resin film on the substrate.

The dyeing treatment is preferably performed by causing the dichromatic substance to adsorb to a resin film. A method for the adsorption is, for example, a method involving immersing the resin film in a dyeing liquid containing the dichromatic substance, a method involving applying the dyeing liquid to the resin film, or a method involving spraying the dyeing liquid on the resin film. Of those, the method involving immersing the resin film in the dyeing liquid is preferred. This is because the dichromatic substance can satisfactorily adsorb thereto.

When iodine is used as the dichromatic substance, an aqueous solution of iodine is preferably used as the dyeing liquid. The compounding amount of iodine is preferably from 0.04 part by weight to 5.0 parts by weight with respect to 100 parts by weight of water. The aqueous solution of iodine is preferably compounded with an iodide in order that the solubility of iodine in water may be increased. Potassium iodide is preferably used as the iodide. The compounding amount of the iodide is preferably from 0.3 part by weight to 15 parts by weight with respect to 100 parts by weight of water.

In the stretching treatment, typically, the resin film is uniaxially stretched at from 3 times to 7 times. A stretching direction can correspond to the absorption axis direction of the polarizer to be obtained.

The resin film preferably further contains boric acid. The boric acid content of the resin film (another portion) is, for example, from 10 wt % to 30 wt %. The resin film containing boric acid is obtained by, for example, bringing a boric acid solution (e.g., an aqueous solution of boric acid) into contact with the resin film at the time of the stretching treatment or the cross-linking treatment.

The low concentration portion is formed by reducing the content of the dichromatic substance. Any appropriate method may be used as a method for the reduction. A typical example thereof is a method involving bringing a basic solution into contact with the resin film containing the dichromatic substance. When the basic solution is brought into contact with the resin film, the content of the dichromatic substance in a desired portion of the resin film can be easily reduced. As a result, a desired portion having a high transmittance can be formed in the resin film. For example, in the case where iodine is used as the dichromatic substance, even when the transmittance is increased by breaking an iodine complex, the iodine complex may be formed again from remaining iodine in association with the use of the polarizer to reduce the transmittance. In the present invention, iodine itself is removed from the resin film. Accordingly, a reduction in transmittance of the low concentration portion in association with the use can be prevented. In addition, the transparency of the low concentration portion is satisfactorily maintained as compared to the case where the dichromatic substance is decomposed with laser light or the like.

Figure 2A:
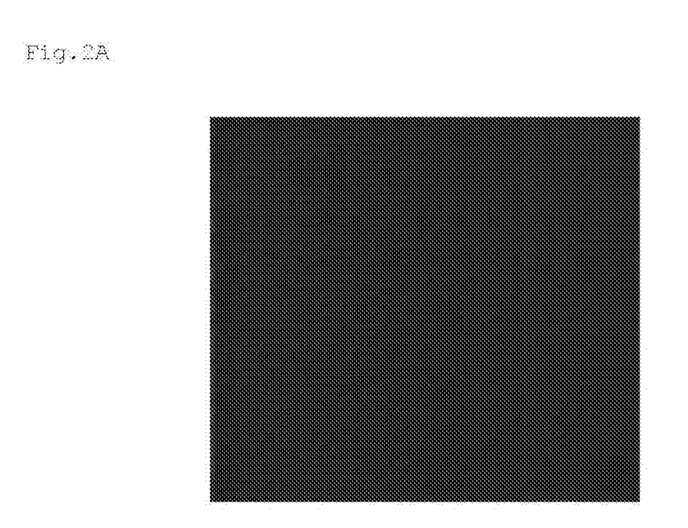
FIG. 2A is a photograph of a resin film before the step of contact with a basic solution.
Figure 2B:
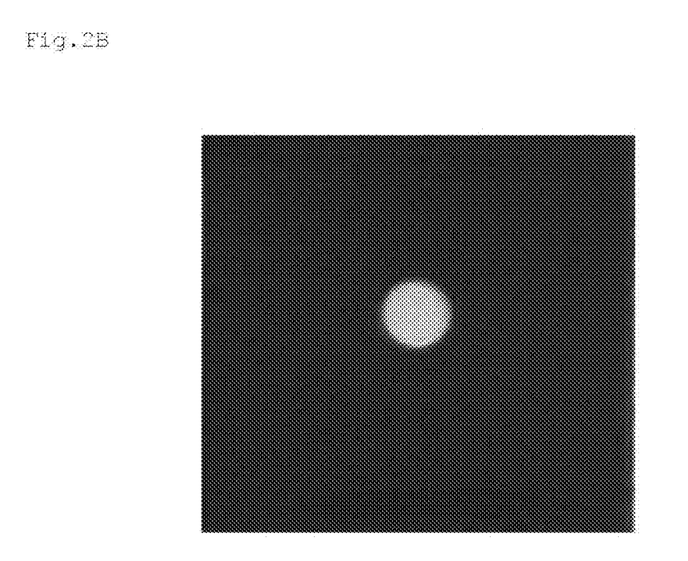
FIG. 2B is a photograph of a resin film after the step of contact with a basic solution.

The case where iodine is used as the dichromatic substance is specifically described. Photographs of the resin film before the step of contact with the basic solution (FIG. 2A) and after the contact step (FIG. 2B) are shown in FIG. 2. After the contact step, the basic solution permeates into the resin film. The iodine complex in the resin film is reduced by the basic solution to become an iodine ion. The reduction into the iodine ion increases the transmittance of a portion brought into contact with the basic solution. Then, iodine that has become the iodine ion moves from the resin film to the solvent of the basic solution. As a result, the iodine content of the portion with which the solution has been brought into contact is reduced, and hence the low concentration portion is formed (white portion of FIG. 2B).

The contact with the basic solution may be performed by using the resin film alone, or may be performed by using a resin film having any appropriate protective film laminated on one of its surfaces. The protective film can be used as it is as a protective film for a polarizing plate to be described later.

Any appropriate basic compound may be used as the basic compound. Examples thereof include: hydroxides of alkali metals, such as sodium hydroxide, potassium hydroxide, and lithium hydroxide; hydroxides of alkaline earth metals, such as calcium hydroxide; inorganic alkali metal salts, such as sodium carbonate; organic alkali metal salts, such as sodium acetate; and ammonia water. Of those basic compounds, hydroxides of alkali metals are preferred, and sodium hydroxide, potassium hydroxide, and lithium hydroxide are more preferred. The use of a hydroxide of an alkali metal can efficiently reduce the amount of the dichromatic substance, and hence more simply provides a low concentration portion having desired characteristics. Those basic compounds may be used alone or in combination.

Any appropriate solvent may be used as the solvent of the basic solution. Specific examples thereof include water, alcohols, such as ethanol and methanol, ethers, benzene, chloroform, and mixed solvents thereof. The solvent is preferably water or an alcohol because the ionized dichromatic substance can satisfactorily migrate to the solvent and can be easily removed.

The concentration of the basic solution is, for example, from 0.01 N to 5 N, preferably from 0.05 N to 3 N, more preferably from 0.1 N to 2.5 N. When the concentration falls within such range, a desired low concentration portion can be satisfactorily formed.

The liquid temperature of the basic solution is, for example, from 20° C. to 50° C. The time period for which the resin film and the basic solution are brought into contact with each other can be set in accordance with the thickness of the resin film, the kind of the basic compound, and the concentration of the basic solution, and is, for example, from 5 seconds to 30 minutes.

Any appropriate means may be used as a method of bringing the basic solution into contact with the resin film. Examples thereof include the dropping of the basic solution, the application thereof, immersion therein, and the spraying thereof. In addition, the resin film may be protected with any appropriate means (e.g., a surface protective film) so that the basic solution may not be brought into contact with a portion except a desired portion. For example, when the basic solution is brought into contact with the resin film, the resin film is covered with the surface protective film so that at least part thereof may be exposed. Specifically, a low concentration portion of a desired shape can be formed by: bonding a surface protective film having a through-hole of a desired shape (specifically the desired shape of the low concentration portion) to the resin film; and bringing the basic solution into contact with the resultant. The resin film is subjected to the step of bringing an acidic solution into contact therewith to be described later while being in a state in which the surface protection is performed.

The low concentration portion is brought into contact with an acidic solution. When the basic solution is brought into contact with the resin film, a low concentration portion may be formed also in an undesired portion by the basic compound remaining in the resin film. When the resin film is brought into contact with the acidic solution, the basic compound can be neutralized. Accordingly, the polarizer of the present invention can be excellent in dimensional stability of the low concentration portion.

Any appropriate acidic compound may be used as an acidic compound in the acidic solution. Examples of the acidic compound include inorganic acids, such as hydrochloric acid, sulfuric acid, nitric acid, hydrogen fluoride, and boric acid, and organic acids, such as formic acid, oxalic acid, citric acid, acetic acid, and benzoic acid. The acidic compound in the acidic solution is preferably an inorganic acid, more preferably hydrochloric acid, sulfuric acid, or nitric acid. Those acidic compounds may be used alone or as a mixture.

Any appropriate solvent may be used as the solvent of the acidic solution. Specific examples thereof include water, alcohols, such as ethanol and methanol, ether, benzene, chloroform, and mixed solvents thereof. Of those, water or an alcohol is preferably used because the basic compound, and an alkali metal and/or an alkaline earth metal in a borate to be described later satisfactorily move to the solvent, and hence can be easily removed.

The concentration of the acidic solution is, for example, from 0.01 N to 5 N, preferably from 0.05 N to 3 N, more preferably from 0.1 N to 2.5 N.

An effect of bringing the acidic solution into contact can be more significantly obtained in a resin film containing boric acid. When the resin film contains boric acid, boric acid may be neutralized by the basic solution to form a borate (metaborate). When the polarizer is placed under a humidified environment, the borate may be hydrolyzed to produce a hydroxide ion (specifically a reaction represented by the following formulae). The produced hydroxide ion may reduce and decompose the dichromatic substance (e.g., an iodine complex) in a portion around the portion with which the basic solution has been brought into contact to further expand the low concentration portion. When the acidic solution is brought into contact with the resin film, boric acid is liberated from the borate to reduce the content of the borate, and hence the production of the hydroxide ion by the hydrolysis can be suppressed. Accordingly, the low concentration portion is prevented from expanding to a portion except a desired portion, and hence the dimensional stability of the low concentration portion (specifically the dimensional stability of the low concentration portion under the humidified environment) can be more significantly improved.

(In the formulae, X represents an alkali metal or an alkaline earth metal).

When the resin film contains boric acid, the boric acid content of the low concentration portion before the contact with the acidic solution is, for example, 5 wt % or more. In addition, the boric acid content before the contact is, for example, 12 wt % or less. In addition, the boric acid content of the low concentration portion after the contact with the acidic solution is, for example, 8 wt % or less. In addition, the boric acid content after the contact is, for example, 0 wt % or more.

In one embodiment, an acidic compound having an acidity stronger than that of boric acid is suitably used as the acidic compound. An indicator of the acidity is, for example, an acid dissociation constant (pKa), and an acidic compound having a pKa smaller than that of boric acid is preferably used.

The pKa is preferably less than 9.2, more preferably 5 or less. The pKa is, for example, −4 or more. When the pKa falls within the range, the dimensional stability of the low concentration portion can be further improved. The pKa may be measured with any appropriate measuring apparatus, and reference may be made to a value disclosed in a literature, such as "Handbook of Chemistry: Pure Chemistry, 5th ed." (edited by The Chemical Society of Japan, Maruzen Publishing Co., Ltd.). In addition, in the case of an acidic compound that dissociates in a multi-stages, its pKa value may change in each stage. When such acidic compound is used, such a compound that any one of the pKa values in the respective stages falls within the range is used. The pKa as used herein refers to a value in an aqueous solution at 25° C.

A difference between the pKa of the acidic compound and the pKa of boric acid is, for example, 2.0 or more, preferably from 2.5 to 15, more preferably from 2.5 to 13. When the difference in pKa falls within the range, an improving effect on the dimensional stability of the low concentration portion (specifically the dimensional stability thereof under a humidified environment) can be more significantly obtained.

Examples of the acidic compound that may satisfy the above-mentioned pKa include hydrochloric acid (pKa: −3.7), sulfuric acid (pK$_2$: 1.96), nitric acid (pKa: −1.8), hydrogen fluoride (pKa: 3.17), formic acid (pKa: 3.54), oxalic acid (pK$_1$: 1.04, pK$_2$: 3.82), citric acid (pK$_1$: 3.09, pK$_2$: 4.75, pK$_3$: 6.41), acetic acid (pKa: 4.8), and benzoic acid (pKa: 4.0).

The liquid temperature of the acidic solution is, for example, from 20° C. to 50° C. The time period for which the resin film is brought into contact with the acidic solution can be set in accordance with the thickness of the resin film, the kind of the acidic compound, and the concentration of the acidic solution, and is, for example, from 5 seconds to 30 minutes.

Any appropriate means may be used as a method of bringing the acidic solution into contact with the resin film. Examples thereof include the dropping of the acidic solution, the application thereof, immersion therein, and the spraying thereof. In addition, the resin film may be brought into contact with the acidic solution under a state in which a portion except the low concentration portion is protected with any appropriate means (e.g., a surface protective film or a mask).

The contact with the acidic solution may be performed in succession with the contact with the basic solution, or may be performed after any other treatment, such as a washing treatment, has been performed subsequently to the contact with the basic solution.

The polarizer of the present invention can be obtained by subjecting the resin film containing the dichromatic substance to those treatments. The resin film may be further subjected to any appropriate other treatment in addition to the treatments. Examples of the other treatment include the removal of the basic solution and/or the acidic solution, and washing.

A method for the removal of the basic solution and/or the acidic solution is specifically, for example, removal by wiping with a waste cloth or the like, removal by suction, natural drying, heat drying, blow drying, or vacuum drying. The drying temperature is, for example, from 20° C. to 100° C.

The washing treatment is performed by any appropriate method. Examples of a solution to be used in the washing treatment include pure water, alcohols, such as methanol and ethanol, an acidic aqueous solution, and mixed solvents thereof. The washing treatment may be performed in any appropriate stage. The washing treatment may be performed a plurality of times.

B. Polarizing Plate

A polarizing plate of the present invention includes the polarizer. The polarizing plate of the present invention is typically used under a state in which a protective film is laminated on at least one side thereof. As materials for forming the protective film, there are given, for example, a cellulose-based resin, such as diacetyl cellulose or triacetyl cellulose, a (meth)acrylic resin, a cycloolefin-based resin, an olefin-based resin, such as polypropylene, an ester-based resin, such as a polyethylene terephthalate-based resin, a polyamide-based resin, a polycarbonate-based resin, and copolymer resins thereof.

The surface of the protective film on which the polarizer is not laminated may have formed thereon a hard coat layer as a surface-treated layer, or may be subjected surface treatment such as an antireflection treatment or a treatment intended for diffusion or for antiglare.

The thickness of the protective film is preferably from 10 μm to 100 μm. The protective film is typically laminated on the polarizer through intermediation of an adhesion layer (specifically an adhesive layer or a pressure-sensitive adhesive layer). The adhesive layer is typically formed of a PVA-based adhesive or an active energy ray-curable adhesive. The pressure-sensitive adhesive layer is typically formed of an acrylic pressure-sensitive adhesive.

C. Image Display Apparatus

An image display apparatus of the present invention includes the polarizing plate. Examples of the image display apparatus include a liquid crystal display apparatus and an organic EL device. Specifically, the liquid crystal display apparatus includes a liquid crystal panel including: a liquid crystal cell; and the polarizer arranged on one side, or each of both sides, of the liquid crystal cell. The organic EL device includes an organic EL panel including the polarizer arranged on a viewer side. The polarizer is arranged so that its low concentration portion may correspond to the camera portion of an image display apparatus on which the polarizer is mounted.

EXAMPLES

Now, the present invention is specifically described by way of Examples. However, the present invention is not limited to these Examples. Methods of measuring a transmittance, an iodine content, and a size change ratio are as described below.

[Transmittance (Ts)]

Measurement was performed with a spectrophotometer (manufactured by Murakami Color Research Laboratory, product name: "DOT-3"). A transmittance (T) is a Y value subjected to visibility correction with the two-degree field of view (C light source) of JIS Z 8701-1982.

[Iodine Content]

The iodine content of a low dichromatic substance concentration portion was determined from a calibration curve created in advance from the X-ray intensity of the low dichromatic substance concentration portion measured by fluorescent X-ray analysis under the following conditions through the use of a standard sample.

Analysis apparatus: manufactured by Rigaku Corporation, X-ray fluorescence (XRF) analysis apparatus, product name "ZSX100e"
Anticathode: rhodium
Dispersive crystal: lithium fluoride
Excitation light energy: 40 kV-90 mA
Iodine measured line: I-LA
Quantification method: FP method
2θ angle peak: 103.078 deg (iodine)
Measurement time: 40 seconds

[Size Change Ratio]

The sizes of the low dichromatic substance concentration portion (transparent portion) of each of the polarizers of Examples 1 to 13 and Comparative Example 2 before and after the performance of a durability test under a 65° C./90% RH environment for 500 hours were measured, and the size change ratio of the low dichromatic substance concentration portion was calculated by using the following equation. As the size change ratio becomes closer to 100, the portion is more excellent in dimensional stability under a humidified environment. The polarizer after the durability test was subjected to edge detection with a super-high-speed flexible image processing system (manufactured by Keyence Corporation, trade name: "XG-7500"), a boundary line between the low dichromatic substance concentration portion and another portion (polarization portion) was drawn, and the size of a portion having the maximum size was measured as the size of the low dichromatic substance concentration portion.

Size change ratio (%)=100×(size of low dichromatic substance concentration portion after durability test)/(initial size of low dichromatic substance concentration portion)

Example 1

An amorphous isophthalic acid-copolymerized polyethylene terephthalate (IPA-copolymerized PET) film of an elongated shape (thickness: 100 μm) having a coefficient of water absorption of 0.75% and a Tg of 75° C. was used as a substrate. One surface of the substrate was subjected to a corona treatment, and an aqueous solution containing polyvinyl alcohol (polymerization degree: 4,200, saponification degree: 99.2 mol %) and acetoacetyl-modified PVA (polymerization degree: 1,200, acetoacetyl modification degree: 4.6%, saponification degree: 99.0 mol % or more, manufactured by The Nippon Synthetic Chemical Industry Co., Ltd., trade name: "GOHSEFIMER Z-200") at a ratio of 9:1 was applied to the corona-treated surface and dried at 25° C. to form a PVA-based resin layer having a thickness of 11 μm. Thus, a laminate was produced.

The resultant laminate was subjected to free-end uniaxial stretching in an oven at 120° C. between rolls having different peripheral speeds in a longitudinal direction (lengthwise direction) at 2.0 times (in-air auxiliary stretching).

Next, the laminate was immersed in an insolubilizing bath having a liquid temperature of 30° C. (an aqueous solution of boric acid obtained by compounding 100 parts by weight of water with 4 parts by weight of boric acid) for 30 seconds (insolubilizing treatment).

Next, the laminate was immersed in a dyeing bath having a liquid temperature of 30° C. while an iodine concentration and an immersion time were adjusted so that a polarizing plate to be obtained had a predetermined transmittance. In this example, the laminate was immersed in an aqueous solution of iodine, which was obtained by compounding 100 parts by weight of water with 0.2 part by weight of iodine and 1.5 parts by weight of potassium iodide, for 60 seconds (dyeing treatment).

Next, the laminate was immersed in a cross-linking bath having a liquid temperature of 30° C. (an aqueous solution of boric acid obtained by compounding 100 parts by weight of water with 3 parts by weight of potassium iodide and 3 parts by weight of boric acid) for 30 seconds (cross-linking treatment).

After that, the laminate was subjected to uniaxial stretching between rolls having different peripheral speeds in a longitudinal direction (lengthwise direction) so that a total stretching ratio became 5.5 times while being immersed in an aqueous solution of boric acid having a liquid temperature of 70° C. (an aqueous solution obtained by compounding 100 parts by weight of water with 4 parts by weight of boric acid and 5 parts by weight of potassium iodide) (underwater stretching).

After that, the laminate was immersed in a washing bath having a liquid temperature of 30° C. (an aqueous solution obtained by compounding 100 parts by weight of water with 4 parts by weight of potassium iodide) (washing treatment).

Subsequently, a PVA-based resin aqueous solution (manufactured by The Nippon Synthetic Chemical Industry Co., Ltd., trade name: "GOHSEFIMER (trademark) Z-200", resin concentration: 3 wt %) was applied to the PVA-based resin layer surface of the laminate, and a protective film (thickness: 25 μm) was bonded thereto, followed by the heating of the resultant in an oven maintained at 60° C. for 5 minutes. After that, the substrate was peeled from the PVA-based resin layer. Thus, a polarizing plate (polarizer (transmittance: 42.3%, thickness: 5 μm)/protective film) was obtained.

A basic solution at normal temperature (an aqueous solution of sodium hydroxide, 1.0 mol/L (1 N)) was dropped to the surface of the polarizing plate having a total thickness of 30 μm obtained in the foregoing on a polarizer side, and the resultant was left to stand for 60 seconds. Next, the droppedaqueous solution of sodium hydroxide was removed with a waste cloth. After the removal of the aqueous solution of sodium hydroxide, a 1.0 mol/L (1 N) hydrochloric acid was dropped to the surface, and the resultant was left to stand for 30 seconds. Next, the hydrochloric acid was removed with a waste cloth. Thus, a polarizer having a low dichromatic substance concentration portion (transparent portion) was obtained. The transmittance, iodine content, and size change ratio of the low dichromatic substance concentration portion are shown in Table 1.

Example 2

A polarizer having a low dichromatic substance concentration portion (transparent portion) was obtained in the same manner as in Example 1 except that the concentration of the hydrochloric acid was changed to 0.1 mol/L (0.1N). The transmittance, iodine content, and size change ratio of the low dichromatic substance concentration portion are shown in Table 1.

Example 3

A polarizer having a low dichromatic substance concentration portion (transparent portion) was obtained in the same manner as in Example 1 except that the concentration of the aqueous solution of sodium hydroxide was changed to 0.1 mol/L (0.1 N). The transmittance, iodine content, and size change ratio of the low dichromatic substance concentration portion are shown in Table 1.

Example 4

A polarizer having a low dichromatic substance concentration portion (transparent portion) was obtained in the same manner as in Example 1 except that the standing time after the dropping of the aqueous solution of sodium hydroxide was changed to 15 seconds. The transmittance, iodine content, and size change ratio of the low dichromatic substance concentration portion are shown in Table 1.

Example 5

A polarizer having a low dichromatic substance concentration portion (transparent portion) was obtained in the same manner as in Example 1 except that potassium hydroxide was used instead of sodium hydroxide. The transmittance, iodine content, and size change ratio of the low dichromatic substance concentration portion are shown in Table 1.

Example 6

A polarizer having a low dichromatic substance concentration portion (transparent portion) was obtained in the same manner as in Example 1 except that the standing time after the dropping of the hydrochloric acid was changed to 15 seconds. The transmittance, iodine content, and size change ratio of the low dichromatic substance concentration portion are shown in Table 1.

Example 7

A polyvinyl alcohol-based film (PVA film) having a thickness of 30 μm (manufactured by Kuraray Co., Ltd., trade name: "VF-PE #3000") was stretched in a machine direction so that a stretching ratio became 2.4 times with respect to its original length while being immersed in warm water having a liquid temperature of 25° C. (swelling bath) to be swollen.

Next, the film was stretched in the machine direction so that a stretching ratio became 3.3 times with respect to the original length while being immersed in a dyeing bath having a liquid temperature of 30° C. (an aqueous solution of iodine obtained by compounding 100 parts by weight of water with 0.04 part by weight of iodine and 0.4 part by weight of potassium iodide) for 60 seconds to be dyed.

Next, the film was immersed in an aqueous solution having a liquid temperature of 30° C. (an aqueous solution obtained by compounding 100 parts by weight of water with 4 parts by weight of boric acid and 3 parts by weight of potassium iodide) for 30 seconds.

Next, the film was stretched in the machine direction so that a stretching ratio became 6 times with respect to the original length while being immersed in a stretching bath having a liquid temperature of 60° C. (an aqueous solution obtained by compounding 100 parts by weight of water with 4 parts by weight of boric acid and 5 parts by weight of potassium iodide) for 40 seconds.

Next, the film was washed by being immersed in a washing bath having a liquid temperature of 30° C. (an aqueous solution obtained by compounding 100 parts by weight of water with 3 parts by weight of potassium iodide) for 10 seconds. Further, the film was dried at 50° C. for 4 minutes to provide a polarizer.

Subsequently, a PVA-based resin aqueous solution (manufactured by The Nippon Synthetic Chemical Industry Co., Ltd., trade name: "GOHSEFIMER (trademark) Z-200", resin concentration: 3 wt %) was applied to the surface of the resultant polarizer, and a protective film (thickness: 25 μm) was bonded thereto, followed by the heating of the resultant in an oven maintained at 60° C. for 5 minutes. Thus, a polarizing plate (polarizer (transmittance: 42.3%, thickness: 12 μm)/protective film) was obtained.

A polarizer having a low dichromatic substance concentration portion (transparent portion) was obtained in the same manner as in Example 1 except that the resultant polarizing plate was used. The transmittance, iodine content, and size change ratio of the low dichromatic substance concentration portion are shown in Table 1.

Example 8

A polarizing plate (polarizer (transmittance: 42.3%, thickness: 18 μm)/protective film) was obtained in the same manner as in Example 7 except that a PVA film having a thickness of 45 μm (manufactured by Kuraray Co., Ltd., trade name: "VF-PE #4500") was used.

A polarizer having a low dichromatic substance concentration portion (transparent portion) was obtained in the same manner as in Example 1 except that the resultant polarizing plate was used. The transmittance, iodine content, and size change ratio of the low dichromatic substance concentration portion are shown in Table 1.

Example 9

A polarizer having a low dichromatic substance concentration portion (transparent portion) was obtained in the same manner as in Example 1 except that an aqueous solution of nitric acid (1.0 mol/L (1.0 N)) was used instead of the hydrochloric acid. The transmittance, iodine content, and size change ratio of the low dichromatic substance concentration portion are shown in Table 1.

Example 10

A polarizer having a low dichromatic substance concentration portion (transparent portion) was obtained in the same manner as in Example 1 except that an aqueous solution of sulfuric acid (1.0 mol/L (1.0 N)) was used instead of the hydrochloric acid. The transmittance, iodine content, and size change ratio of the low dichromatic substance concentration portion are shown in Table 1.

Example 11

A polarizer having a low dichromatic substance concentration portion (transparent portion) was obtained in the same manner as in Example 1 except that: an aqueous solution of acetic acid (1.0 mol/L (1.0 N)) was used instead of the hydrochloric acid; and the standing time after the dropping of the aqueous solution of acetic acid was changed to 60 seconds. The transmittance, iodine content, and size change ratio of the low dichromatic substance concentration portion are shown in Table 1.

Example 12

A polarizer having a low dichromatic substance concentration portion (transparent portion) was obtained in the same manner as in Example 1 except that: an aqueous solution of citric acid (1.0 mol/L (1.0 N)) was used instead of the hydrochloric acid; and the standing time after the dropping of the aqueous solution of citric acid was changed to 60 seconds. The transmittance, iodine content, and size change ratio of the low dichromatic substance concentration portion are shown in Table 1.

Example 13

A polarizer having a low dichromatic substance concentration portion (transparent portion) was obtained in the same manner as in Example 1 except that: an aqueous solution of boric acid (1.0 mol/L (1.0 N)) was used instead of the hydrochloric acid; and the standing time after the dropping of the aqueous solution of boric acid was changed to 60 seconds. The transmittance, iodine content, and size change ratio of the low dichromatic substance concentration portion are shown in Table 1.

Comparative Example 1

An attempt was made to produce a polarizer having a low dichromatic substance concentration portion in the same manner as in Example 1 except that: pure water was used instead of the basic solution; and the contact step with the hydrochloric acid was not performed. The transmittance and iodine content of the portion brought into contact with the pure water are shown in Table 1.

Comparative Example 2

A polarizer having a low dichromatic substance concentration portion (transparent portion) was obtained in the same manner as in Example 1 except that the contact step with the hydrochloric acid was not performed. The transmittance, iodine content, and size change ratio of the low dichromatic substance concentration portion are shown in Table 1.

TABLE 1

|  | Thickness of polarizer (μm) | Basic solution Basic compound | Acidic solution Acidic compound | pKa | Iodine content (wt %) | Transmittance (%) | Size change ratio (%) |
|---|---|---|---|---|---|---|---|
| Example 1 | 5 | Sodium hydroxide | Hydrochloric acid | −3.7 | 0.12 | 93.5 | 100.5 |
| Example 2 | 5 | Sodium hydroxide | Hydrochloric acid | −3.7 | 0.1 | 93.4 | 100.6 |
| Example 3 | 5 | Sodium hydroxide | Hydrochloric acid | −3.7 | 0.11 | 93.3 | 100.4 |
| Example 4 | 5 | Sodium hydroxide | Hydrochloric acid | −3.7 | 0.11 | 93.5 | 100.8 |
| Example 5 | 5 | Potassium hydroxide | Hydrochloric acid | −3.7 | 0.9 | 93.7 | 100.4 |
| Example 6 | 5 | Sodium hydroxide | Hydrochloric acid | −3.7 | 0.1 | 93.1 | 100.2 |
| Example 7 | 12 | Sodium hydroxide | Hydrochloric acid | −3.7 | 0.21 | 93.1 | 100.9 |
| Example 8 | 18 | Sodium hydroxide | Hydrochloric acid | −3.7 | 0.19 | 92.8 | 100.7 |
| Example 9 | 5 | Sodium hydroxide | Nitric acid | −1.8 | 0.09 | 93.2 | 100.2 |
| Example 10 | 5 | Sodium hydroxide | Sulfuric acid | 1.96 ($pK_2$) | 0.11 | 93.4 | 100.8 |
| Example 11 | 5 | Sodium hydroxide | Acetic acid | 4.8 | 0.11 | 93.3 | 102.6 |
| Example 12 | 5 | Sodium hydroxide | Citric acid | 6.41 ($pK_3$) | 0.21 | 93.3 | 101.1 |
| Example 13 | 5 | Sodium hydroxide | Boric acid | 9.2 | 0.14 | 93.6 | 122.7 |
| Comparative Example 1 | 5 | — | None | — | 5.1 | 42.3 | — |
| Comparative Example 2 | 5 | Sodium hydroxide | None | — | 0.11 | 93.3 | 130.3 |

Figure 3A:
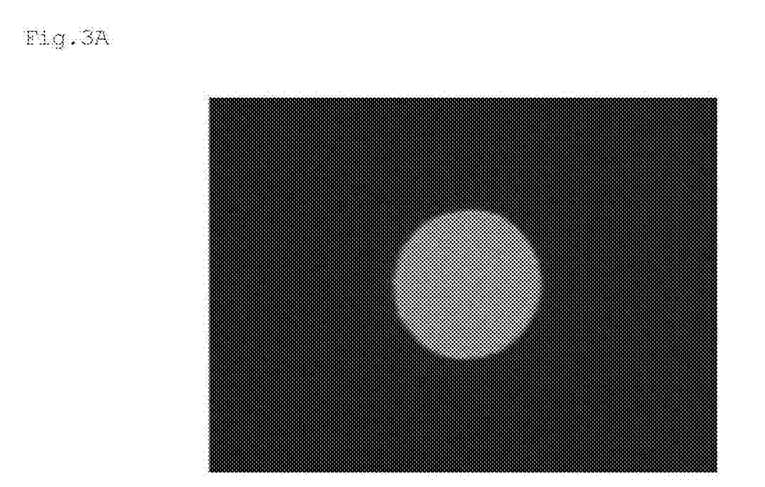
FIG. 3A is a photograph of a polarizer obtained in Example 1 before a durability test.
Figure 3B:
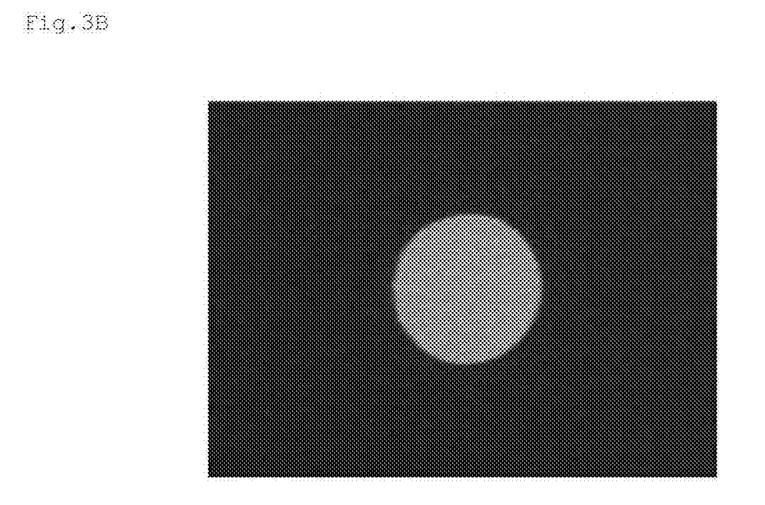
FIG. 3B is a photograph of a polarizer obtained in Example 1 after a durability test.
Figure 4A:
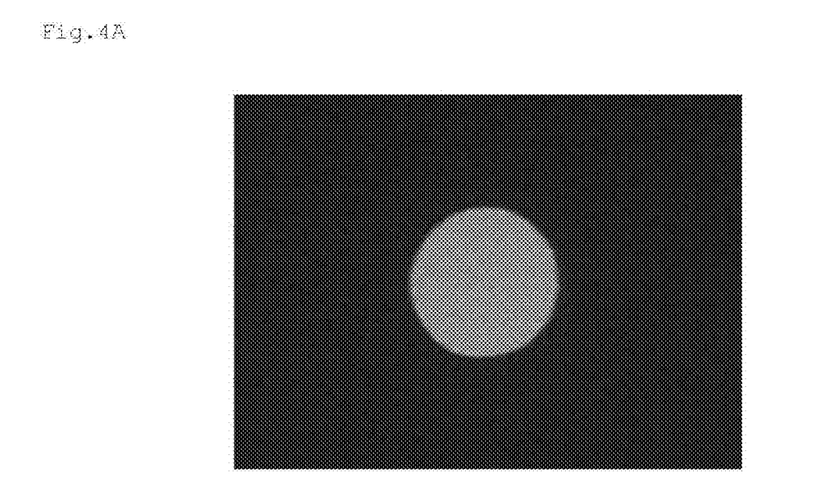
FIG. 4A is a photograph of a polarizer obtained in Comparative Example 2 before a durability test.
Figure 4B:
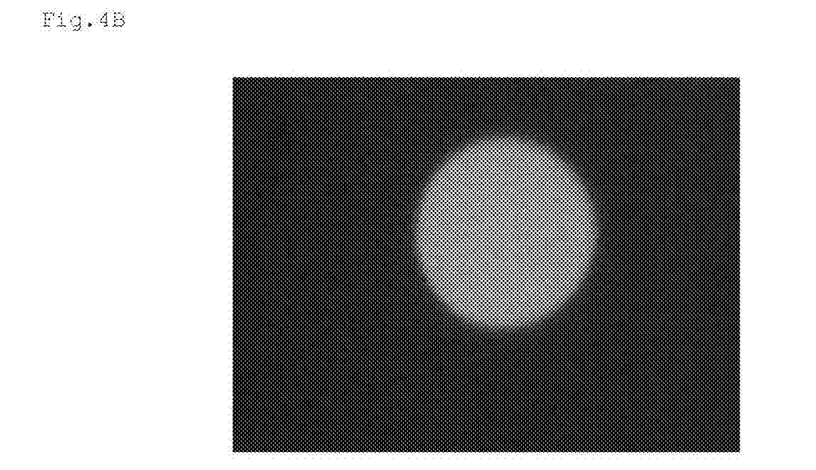
FIG. 4B is a photograph of a polarizer obtained in Comparative Example 2 after a durability test.

In each of Examples 1 to 13, the content of the dichromatic substance was reduced and hence the low dichromatic substance concentration portion was formed. The low concentration portion had a transmittance as high as 90% or more. Further, in each of Examples 1 to 13, the size change ratio was small and hence the dimensional stability of the low concentration portion under the humidified environment was excellent. FIG. 3A and FIG. 3B are photographs of the polarizer of Example 1 before and after the durability test. In the polarizer of Example 1, the shape of the low concentration portion was satisfactorily maintained even after the durability test had been performed under the 65° C./90% RH environment for 500 hours. In Comparative Example 1 in which the surface of the polarizing plate on a polarizer side was brought into contact with the pure water, the iodine content was not reduced, and hence the transmittance of the contact portion was at the same level as the transmittance of the untreated portion (42.3%). In addition, in Comparative Example 2, the low concentration portion was formed and its transmittance increased. However, in Comparative Example 2 in which the contact step with the acidic solution was not performed, the size change ratio was large, and hence the dimensional stability under the humidified environment should be improved. FIG. 4A and FIG. 4B are photographs of the polarizer of Comparative Example 2 before and after the durability test. The portion of the polarizer of Comparative Example 2 having a high transmittance expanded after the durability test under the 65° C./90% RH environment for 500 hours, and its contour became unclear.

INDUSTRIAL APPLICABILITY

The polarizer of the present invention is suitably used in an image display apparatus (a liquid crystal display apparatus or an organic EL device) with a camera of, for example, a cellular phone, such as a smart phone, a notebook PC, or a tablet PC.

CITATION LIST 1 polarizer
2 low dichromatic substance concentration portion

The invention claimed is:

1. A polarizer, comprising a resin film containing a dichroic substance, the polarizer having, in the resin film, a low dichroic substance concentration portion whose content of the dichroic substance is relatively low,
    the low dichroic substance concentration portion is brought into contact with an acidic solution,
    the resin film contains boric acid,
    the acidic solution contains an acidic compound having an acidity stronger than that of boric acid,
    wherein the low dichroic substance concentration portion has a dichroic substance content of 1.0 wt % or less, and
    a difference between the content of the dichroic substance in the low dichroic substance concentration portion and a content of the dichromatic substance in another portion of the polarizer is 1 wt % or more.

2. The polarizer according to claim 1, wherein the acidic solution contains an acidic compound having an acid dissociation constant of less than 9.2.

3. The polarizer according to claim 1, wherein the resin film comprises a polyvinyl alcohol-based resin film containing iodine.

4. The polarizer according to claim 1, wherein the low dichroic substance concentration portion has a transmittance of 50% or more.

5. The polarizer according to claim 1, wherein the polarizer has a thickness of 30 μm or less.

6. The polarizer according to claim 1, wherein the low dichroic substance concentration portion corresponds to a camera portion of an image display apparatus on which the polarizer is mounted.

7. A polarizing plate, comprising the polarizer of claim 1.

8. An image display apparatus, comprising the polarizing plate of claim 7.

* * * * *